(12) United States Patent
Nakano et al.

(10) Patent No.: US 11,592,340 B2
(45) Date of Patent: Feb. 28, 2023

(54) CIRCUIT DEVICE AND TEMPERATURE DETECTION SYSTEM

(71) Applicants: SANYO Electric Co., Ltd., Daito (JP); Panasonic Corporation, Kadoma (JP)

(72) Inventors: Shinya Nakano, Hyogo (JP); Yoshitaka Ishikawa, Hyogo (JP); Kenji Koizumi, Kanagawa (JP); Chikara Ohmori, Osaka (JP); Naohisa Morimoto, Osaka (JP)

(73) Assignees: SANYO Electric Co., Ltd., Daito (JP); PANASONIC HOLDINGS CORPORATION, Kadoma (JP)

( * ) Notice: Subject to any disclaimer, the term of this patent is extended or adjusted under 35 U.S.C. 154(b) by 378 days.

(21) Appl. No.: 16/634,666

(22) PCT Filed: Jul. 23, 2018

(86) PCT No.: PCT/JP2018/027413
§ 371 (c)(1),
(2) Date: Jan. 28, 2020

(87) PCT Pub. No.: WO2019/026656
PCT Pub. Date: Feb. 7, 2019

(65) Prior Publication Data
US 2021/0126333 A1    Apr. 29, 2021

(30) Foreign Application Priority Data
Aug. 4, 2017    (JP) .............................. JP2017-151645

(51) Int. Cl.
*G01K 7/22*    (2006.01)
*H04B 15/00*   (2006.01)
*G01K 7/24*    (2006.01)

(52) U.S. Cl.
CPC ................. *G01K 7/22* (2013.01); *G01K 7/24* (2013.01); *H04B 15/00* (2013.01)

(58) Field of Classification Search
USPC .................................................. 374/163, 100
See application file for complete search history.

(56) References Cited

U.S. PATENT DOCUMENTS 5,161,893 A * 11/1992 Shigezawa ............... G01K 7/13
                                                                374/182
5,982,253 A * 11/1999 Perrin ..................... H03H 7/427
                                                                333/182
(Continued)

FOREIGN PATENT DOCUMENTS

DE    102010003125 A1 *  9/2011    ........... G01K 15/007
DE    102020105475 A1 * 10/2020
(Continued)

OTHER PUBLICATIONS

Translation of JP2002164509A (Year: 2002).*
(Continued)

*Primary Examiner* — Mirellys Jagan
(74) *Attorney, Agent, or Firm* — WHDA, LLP (57) ABSTRACT

A circuit device that is connected to a temperature detection element that detects a temperature of an object via an external signal line and an external signal ground line includes a connector that is connected to the external signal line and the external signal ground line, an internal signal line that is connected to the external signal line via the connector, an internal signal ground line that is connected to the external signal ground line via the connector, a controlling circuit that is connected to the internal signal line and the internal signal ground line and detects the temperature of the object, and a high-frequency filter that is inserted into at least one of a foremost stage of the internal signal line and (Continued)

a foremost stage of the internal signal ground line as viewed from the connector.

7 Claims, 6 Drawing Sheets

(56) References Cited

U.S. PATENT DOCUMENTS

| | | | | |
|---|---|---|---|---|
| 6,215,076 | B1* | 4/2001 | Inagawa | H05K 1/0233 |
| | | | | 174/250 |
| 2002/0178319 | A1* | 11/2002 | Sanchez-Olea | G02B 6/4246 |
| | | | | 710/305 |
| 2015/0346131 | A1* | 12/2015 | Mohseni | G01N 27/221 |
| | | | | 29/846 |
| 2019/0269009 | A1* | 8/2019 | Park | H05K 1/028 |

FOREIGN PATENT DOCUMENTS

| | | | | |
|---|---|---|---|---|
| GB | 2054979 | A | * 2/1981 | ........... H04B 15/025 |
| JP | 2000-307403 | A | 11/2000 | |
| JP | 2001-24293 | A | 1/2001 | |
| JP | 2002-164509 | A | 6/2002 | |
| JP | 2009-8431 | A | 1/2009 | |
| JP | 2010-54688 | A | 3/2010 | |
| JP | 2010-249687 | A | 11/2010 | |
| KR | 20210150128 | A | * 12/2021 | |
| WO | WO9101110 | A1 | * 2/1991 | |

OTHER PUBLICATIONS

Translation of JP2009008431a (Year: 2009).*
Translation of JP2000307403A (Year: 2000).*
Translation of International Search Report dated Oct. 16, 2018, issued in counterpart Application No. PCT/JP2018/027413. (1 page).

* cited by examiner

CIRCUIT DEVICE AND TEMPERATURE DETECTION SYSTEM

TECHNICAL FIELD

The present invention relates to a circuit device and a temperature detection system for detecting a temperature of an object.

BACKGROUND ART

In order to detect a temperature of an object, a thermistor is often used. A thermistor element is installed on a surface of or near the object and is connected to a circuit board via a wire harness. For example, in a case where the object is a battery, the temperature detected by the thermistor is used not only for detection of a high temperature abnormality or a low temperature abnormality, but also for temperature correction at a time of calculation of a state of charge (SOC), a state of health (SOH), or internal resistance. Therefore, high accuracy is required for a detection value of the thermistor. In order to improve detection accuracy of the thermistor, it is important to increase noise immunity.

In order to measure the noise immunity, an electromagnetic compatibility (EMC) test is performed. During an EMC test, a strong noise (in general, common-mode noise referenced to chassis ground) is applied to a test sample from outside to test whether the detection value of the thermistor changes. In a case where the detection value of the thermistor changes, when the thermistor is replaced by a fixed resistance, the detection value may stop changing. In this case, the noise is not causing an erroneous detection of a detection circuit on a side of the substrate. The noise enters the side of the thermistor and a resistance value of the thermistor decreases, resulting in a change in the detection value. A thermistor has properties of generating heat when a high-frequency current flows through the thermistor, causing a decrease in the resistance value. When a high-frequency current caused by the noise applied from outside flows into the thermistor element, the thermistor element generates heat and the resistance value of the thermistor element decreases.

As a measure of a thermistor against noise, provision of a noise filter proximately to the thermistor element has been proposed (for example, see PTL 1). However, an addition of a part to an inside of an electric device of a thermistor that is mass produced or provision of a part in a middle part of a wire harness causes an increase in a cost.

CITATION LIST

PTL 1: Unexamined Japanese Patent Publication No. 2009-8431

SUMMARY OF THE INVENTION

Regarding the change in the detection value of the thermistor described above, since an abnormal portion is located outside the circuit board, it has been thought that improvement cannot be achieved by a measure taken inside the substrate. The countermeasures that have been taken thus far are mainly an adjustment of antenna characteristics of a harness connected to the thermistor element through a change in routing of the harness. This method has often resulted in a continuous process of trial and error, and has extended a countermeasure period.

Moreover, when it has been impossible to adjust the antenna characteristics of the harness, using an expensive external part such as a ferrite core in the harness has been required, resulting in a large increase in cost. Moreover, the change in the routing of the thermistor harness has required dismantling of a system once before the change in the routing. Therefore, just performing an evaluation has taken an extremely long period of time. Moreover, since a verified effect depends on the routing of the harness, the effect has been affected by manufacturing variation, and thus there has been a risk of reoccurrence of a failure at an end of trial production. Note that the above argument applies to a case where another temperature detection element such as a thermocouple is used instead of a thermistor.

The present invention has been conceived in light of such circumstances, and an object thereof is to provide a technique of increasing the noise immunity of a temperature detection element simply and at low cost.

In order to solve the problem described above, a circuit device of one aspect of the present invention is a circuit device that is connected to a temperature detection element that detects a temperature of an object via an external signal line and an external signal ground line, and includes a connector that is connected to the external signal line and the external signal ground line, an internal signal line that is connected to the external signal line via the connector, an internal signal ground line that is connected to the external signal ground line via the connector, a controlling circuit that is connected to the internal signal line and the internal signal ground line and detects the temperature of the object, and a high-frequency filter that is inserted into at least one of a foremost stage of the internal signal line and a foremost stage of the internal signal ground line as viewed from the connector.

Any desired combinations of the above-described configuration elements and converted expressions of the present invention in methods, devices, systems, and other similar entities are still effective as aspects of the present invention.

According to the present invention, the noise immunity of a temperature detection element can be increased simply and at low cost.

DESCRIPTION OF EMBODIMENTS

Figure 1:
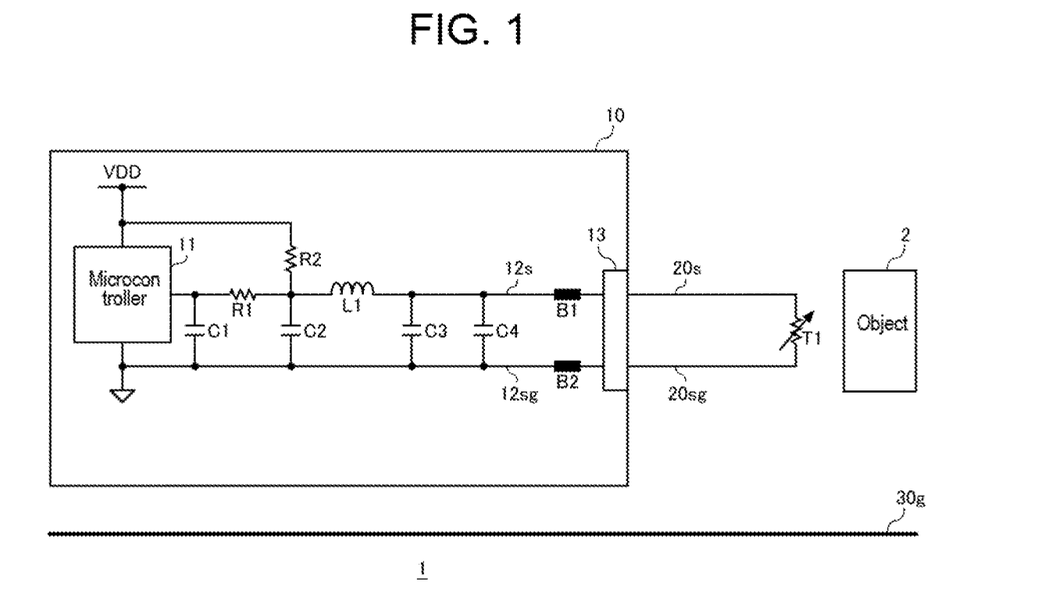
FIG. 1 is a diagram showing a configuration of temperature detection system according to an exemplary embodiment of the present invention.

FIG. 1 is a diagram showing a configuration of temperature detection system 1 according to an exemplary embodiment of the present invention. Temperature detection system 1 is a system that includes circuit device 10 and thermistor element T1 and detects a temperature of object 2. Thermistor element T1 is installed on a surface of or near object 2. In the present exemplary embodiment, it is assumed that object 2 is a driving battery (traction battery) mounted on a vehicle. The driving battery includes a plurality of battery cells connected in series or in series-parallel. A lithium ion battery or a nickel metal hydride battery can be used as the battery cell.

Thermistor element T1 and circuit device 10 are connected to each other via external signal line 20s and external signal ground line 20sg. External signal line 20s and external signal ground line 20sg each include a wire harness. One end of the wire harness is connected to each end of thermistor element T1, and another end of the wire harness is connected to connector 13 of circuit device 10. A male connector is attached to the other end of the wire harness and fitted into female connector 13 of circuit device 10 for connection.

The driving battery, thermistor element T1, external signal line 20s, external signal ground line 20sg, and circuit device 10 are stored in an exterior box while being insulated from each other. The exterior box includes a conductive housing such as a metal housing, and is fixed to a predetermined position in the vehicle. The conductive housing is chassis ground 30g.

Circuit device 10 is an electronic circuit with a substrate on which various electronic components are mounted. In the present exemplary embodiment, power source for circuit device 10 is supplied from an auxiliary battery in the vehicle. In general, a 12V output lead-acid battery is used for the auxiliary battery. Circuit device 10 includes microcontroller 11. Control power source voltage (for example, 3 V to 5 V) reduced by a regulator (not shown) from voltage (for example, 12 V) supplied from the auxiliary battery is applied to a power source terminal of microcontroller 11.

Internal signal line 12s connects an analogue input port of microcontroller 11 to a terminal of connector 13 to which external signal line 20s is connected. Internal signal line 12s includes a strip line or a microstrip line. Internal signal ground line 12sg connects a ground terminal of microcontroller 11 to a terminal of connector 13 to which external signal ground line 20sg is connected. Internal signal ground line 12sg includes a ground plane. Internal signal ground line 12sg is connected to negative wiring of the auxiliary battery, and serves as a ground potential of the substrate.

Internal signal line 12s is pulled up to the control power source voltage via second resistor R2. A low-pass filter is connected to a foremost stage as viewed from the analogue input port of microcontroller 11. Specifically, first resistor R1 is connected to the analogue input port of microcontroller 11, and first capacitor C1 is connected between the analogue input port and internal signal ground line 12sg. In the exemplary embodiment described above, a configuration is provided in which the low-pass filter is connected to the foremost stage as viewed from the analogue input port of microcontroller 11. However, the low-pass filter does not have to be provided.

A n-type filter is connected to a stage next to the low-pass filter described above as viewed from microcontroller 11. The n-type filter is configured with a parallel connection of second capacitor C2 and third capacitor C3 before and after first inductor L1 inserted into internal signal line 12s. In addition, fourth capacitor C4 is connected in parallel to a stage next to the n-type filter so as to enhance an effect of noise attenuation. The n-type filter is a filter suitable for a case where an impedance on an input side and an impedance on an output side are both high. In the exemplary embodiment described above, a configuration is provided in which the n-type filter is connected to the stage next to the low-pass filter described above as viewed from microcontroller 11. However, the n-type filter does not have to be provided.

Hereinafter, a state before first chip bead B1 and second chip bead B2 are connected is considered. As described above, thermistor element T1 has properties of generating heat, when a high-frequency current flows through the thermistor, and causing a decrease in the resistance value. During an EMC test, common-mode noise referenced to chassis ground 30g is applied to a test sample. Since the common-mode noise does not give a potential difference to thermistor, element T1, the common-mode noise does cause a problem. However in case where a characteristic impedance becomes discontinuous in a portion due to a structural difference such as a difference between a substrate and a harness, the common-mode noise is converted into normal-mode noise, a potential difference is generated between external signal line 20s and external signal ground line 20sg, and a high-frequency current flows through thermistor element T1.

Figure 2A:
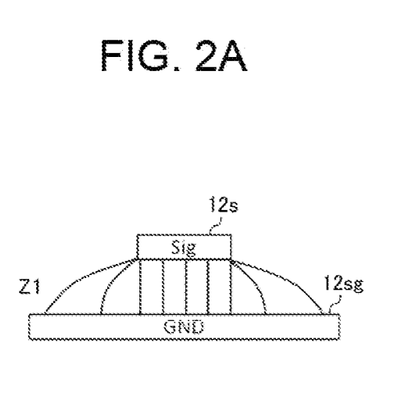
FIGS. 2A and 2B are diagrams schematically drawing electric lines of force between an internal signal line and an internal signal ground line of a circuit device, and electric lines of force between an external signal line and an external signal ground line, respectively.
Figure 2B:
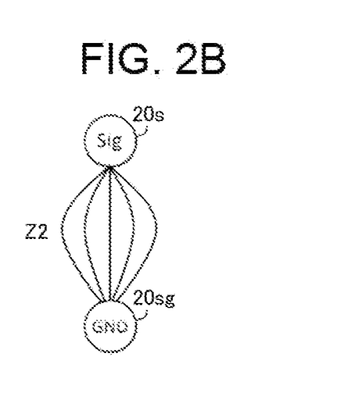

FIGS. 2A and 2B are diagrams schematically drawing electric lines of force between internal signal line 12s and internal signal ground line 12sg of circuit device 10, and electric lines of force between external signal line 20s and external signal ground line 20sg, respectively. As described above, in the present exemplary embodiment, internal signal line 12s includes a strip line or a microstrip line, and internal signal ground line 12sg includes a ground plane. On the other hand, external signal line 20s and external signal ground line 20sg each include a twin parallel cable or twisted pair cable wire harness. Thus, a physical structure of wiring is different between the inside and the outside of the substrate. Therefore, a metallic bond differs between the wirings. Accordingly, a difference also occurs between characteristic impedance Z1 between internal signal line 12s and internal signal ground line 12sg and characteristic impedance Z2 between external signal line 20s and external signal ground line 20sg.

Figure 3A:
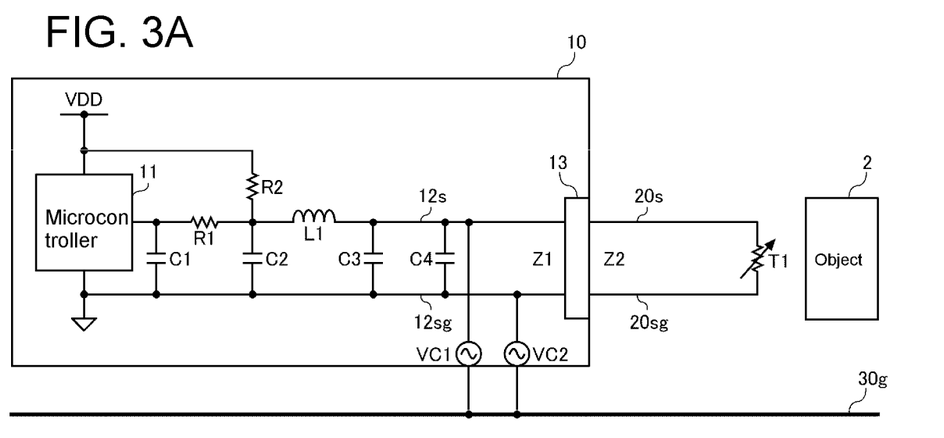
FIGS. 3A and 3B are diagrams for describing a principle of conversion from common-mode noise into normal-mode noise.
Figure 3B:
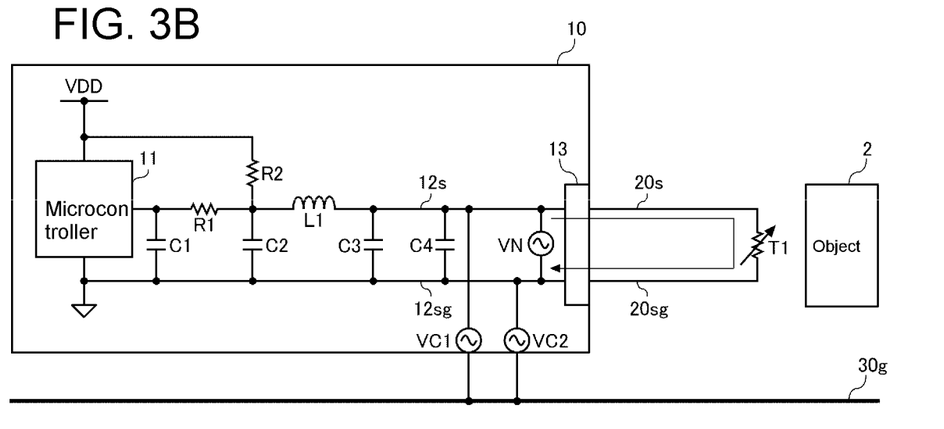

FIGS. 3A and 3B are diagrams for describing a principle of conversion from common-mode noise into normal-mode noise. As shown in FIG. 3A, noise VC1 between internal signal line 12s and chassis ground 30g and noise VC2 between internal signal ground line 2sg and chassis ground 30g are supposed to be common-mode noise and thus are not supposed to affect a detection signal of thermistor element T1.

However, due to the difference in a wiring structure described above, a difference occurs, near connector 13, between characteristic impedance Z1 between internal signal line 12s and internal signal ground line 12sg and characteristic impedance Z2 between external signal line 20s and external signal ground line 20sg. Therefore, as shown in FIG. 3B, common-mode noise (VC1, VC2) is converted into normal-mode noise (VN), Due to this normal-mode noise (VN), a high-frequency current flows through thermistor element T1. Thermistor element T1 self-heats and the resistance value decreases. As a result, both-end voltage of thermistor element T1 decreases, resulting in an error in the detection value.

In FIG. 1 described above, in order to suppress an inflow of a high-frequency current into thermistor element T1 due to normal-mode noise (VN), first chip bead B1 and second chip bead B2 are inserted into the foremost stage of internal signal line 12s and the foremost stage of internal signal ground line 12sg as viewed from connector 13, respectively. A chip bead (ferrite bead) is an element that has properties of both an inductor and a resistance. In a low-frequency band, the property of an inductor intensifies, and in a high-frequency band, the property of a resistance intensifies. Therefore, high-frequency noise can be eliminated while a direct current component and a low-frequency component are not attenuated.

First chip bead B1 and second chip bead B2 are preferably disposed near connector 13. Common-mode noise is converted into normal-mode noise near connector 13. Therefore, a noise reduction effect increases when chip beads B1, B2 are disposed closer to connector 13. Moreover, a wideband type bead is preferably used for first chip bead B1 and second chip bead B2. During an EMC test in which a wide range of frequencies is tested, using a wideband type bead provides a stable noise reduction effect in a wide frequency range.

In the exemplary embodiment described above, a strip line or a microstrip line is exemplified as a configuration of internal signal line 12s. However, the configuration is not limited to this configuration. As long as a configuration is adopted in which there is a difference in the characteristic impedance between internal signal line 12s and internal signal ground line 12sg, the noise reduction effect can be obtained through insertion of first chip bead B1 and second chip bead B2 into the foremost stage of internal signal line 12s and the foremost stage of internal signal ground line 12sg, respectively.

Figure 4:
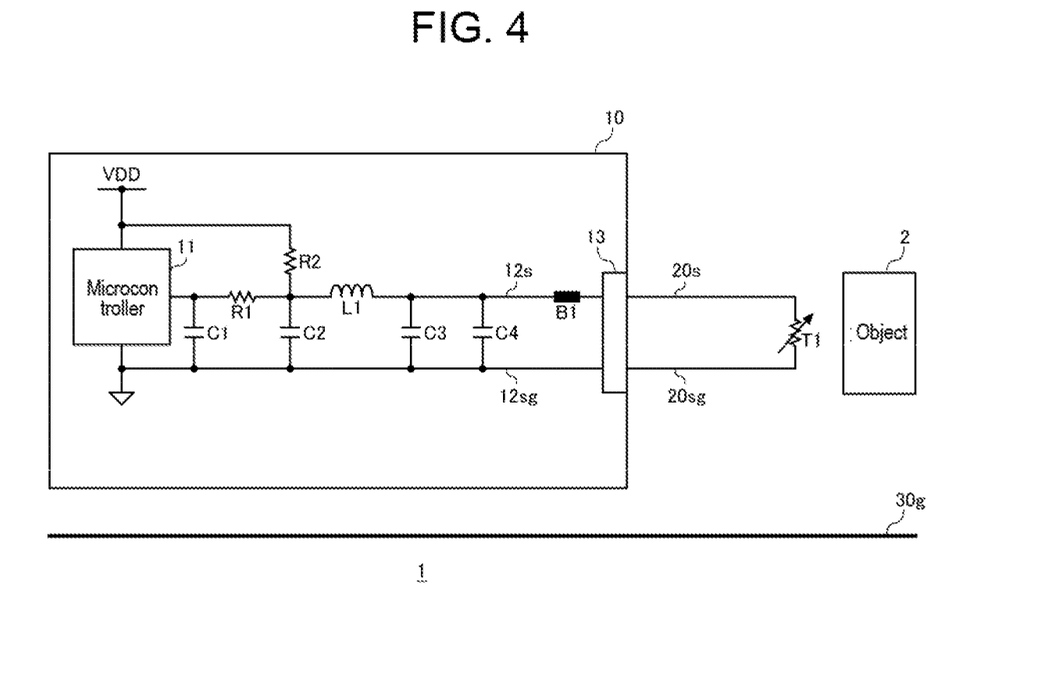
FIG. 4 is a diagram showing a configuration of a temperature detection system according to modified example 1 of the present invention.

FIG. 4 is a diagram showing a configuration of temperature detection system 1 according to modified example 1 of the present invention. In the circuit configuration shown in FIG. 1, an example has been described in which first chip bead B1 and second chip bead B2 are inserted into both of internal signal line 12s and internal signal ground line 12sg. In this respect, even when a chip bead is inserted into either internal signal line 12s or internal signal ground line 12sg, a certain effect can be obtained. FIG. 4 shows an example in which chip bead B1 is inserted only on the side of internal signal line 12s. Alternatively, chip bead B2 may be inserted only on the side of internal signal ground line 12sg. Regardless of the side on which a bead is inserted, the insertion can provide an effect of suppressing the inflow of a noise current generated near connector 13, as shown in FIG. 3B, into thermistor element T1.

Figure 5:
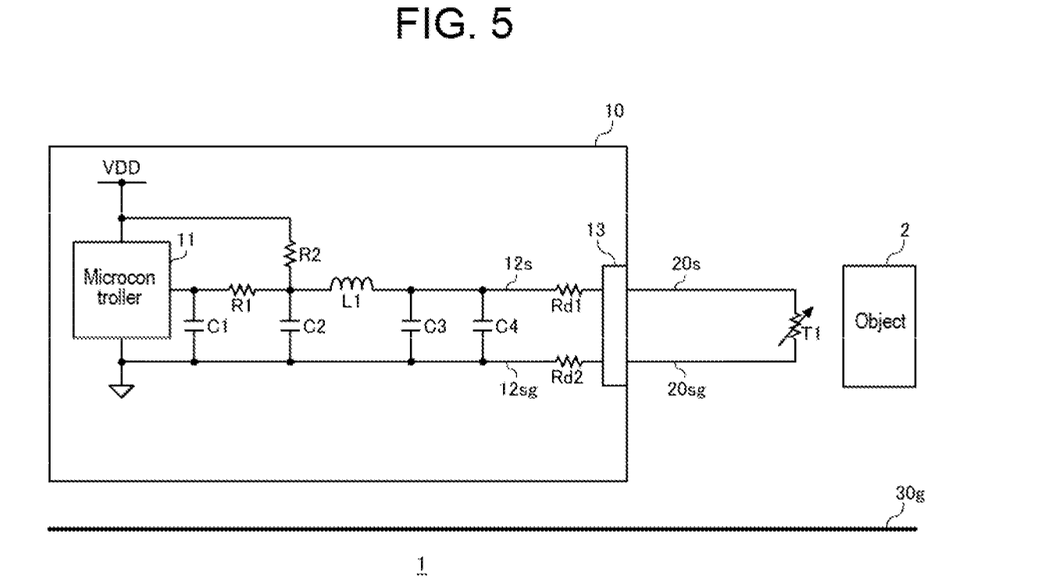
FIG. 5 is a diagram showing a configuration of a temperature detection system according to modified example 2 of the present invention.
Figure 6:
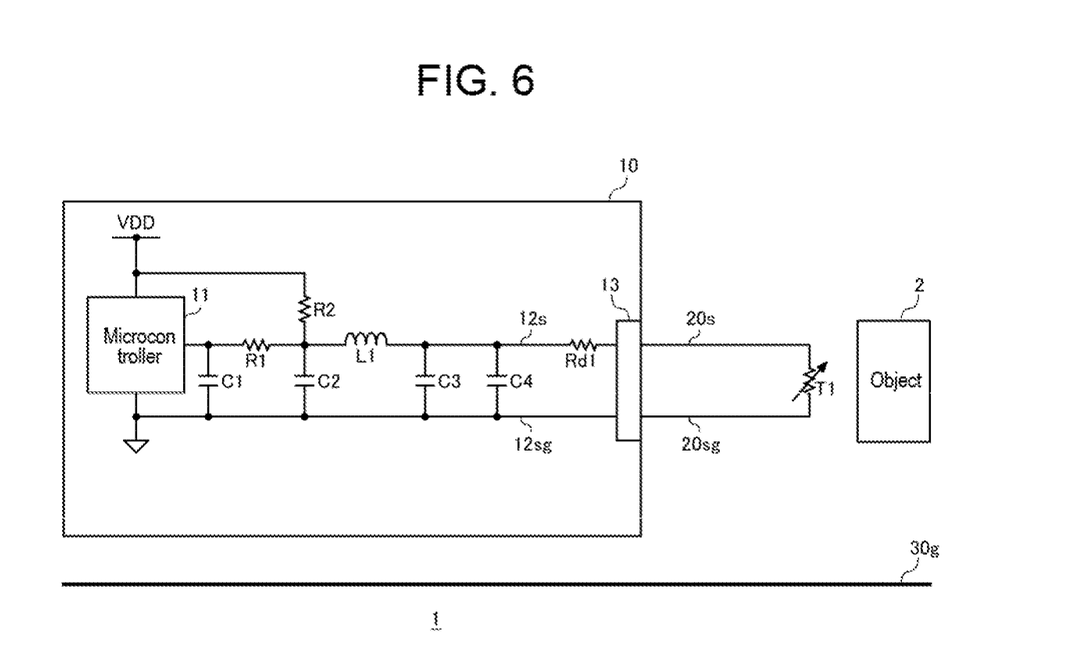
FIG. 6 is a diagram showing a configuration of a temperature detection system according to modified example 3 of the present invention.

FIG. 5 is a diagram showing a configuration of temperature detection system 1 according to modified example 2 of the present invention. FIG. 6 is a diagram showing a configuration of temperature detection system 1 according to modified example 3 of the present invention. In the circuit configurations shown in FIGS. 1 and 4, an example in which a chip head is used as a high-frequency filter that suppresses a noise current generated near connector 13. In this respect, a damping resistor may be used instead of a chip head. A damping resistor is a resistance having a low resistance value, and provides an effect of suppressing a current. However, unlike a chip bead, a damping resistor exerts the suppression effect on a direct current component and low-frequency component current.

In FIG. 5, first damping resistor Rd1 and second damping resistor Rd2 are inserted into both of internal signal line 12s and internal signal ground line 12sg, respectively FIG. 6 shows an example in which damping resistor Rd1 is inserted only on the side of internal signal line 12s. Alternatively, damping resistor Rd2 may be inserted only on the side of internal signal ground line 12sg.

Figure 7:
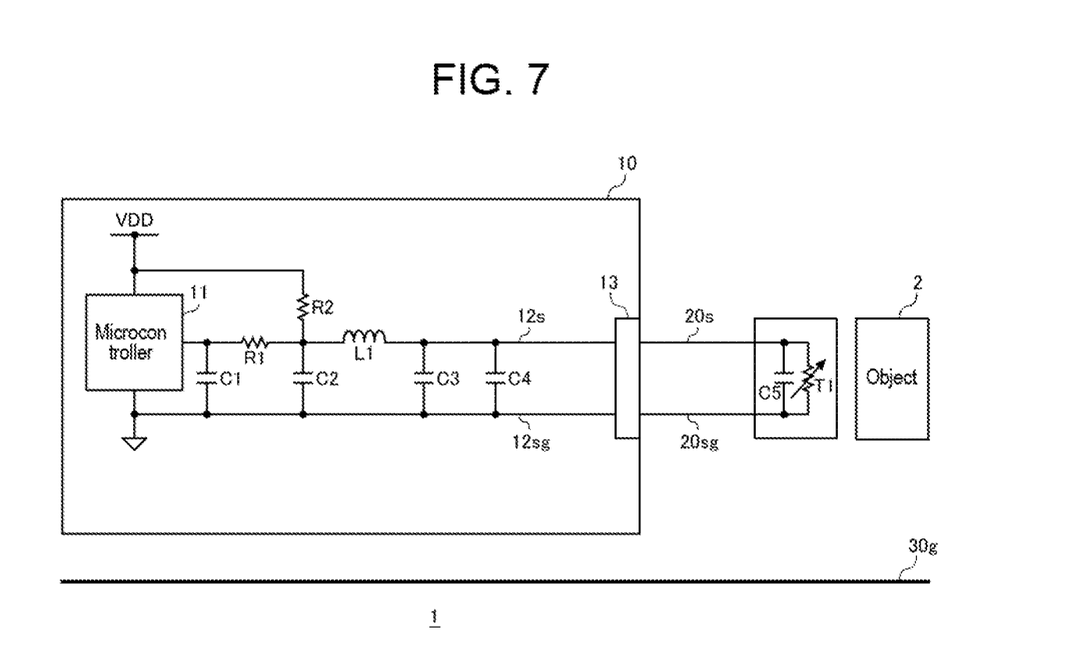
FIG. 7 is a diagram showing a configuration of a temperature detection system according to modified example 4 of the present invention.

FIG. 7 is a diagram showing a configuration of temperature detection system 1 according to modified example 4 of the present invention. In modified example 4, instead of inserting a chip bead or a damping resistor near connector 13 in circuit device 10, fifth capacitor C5 is connected in parallel to thermistor element T1. Fifth capacitor C5 is enclosed within thermistor element T1. An addition of fifth capacitor C5 on the side of thermistor element T1 enables a noise current generated near connector 13 to bypass thermistor element T1 via fifth capacitor C5.

Figure 8:
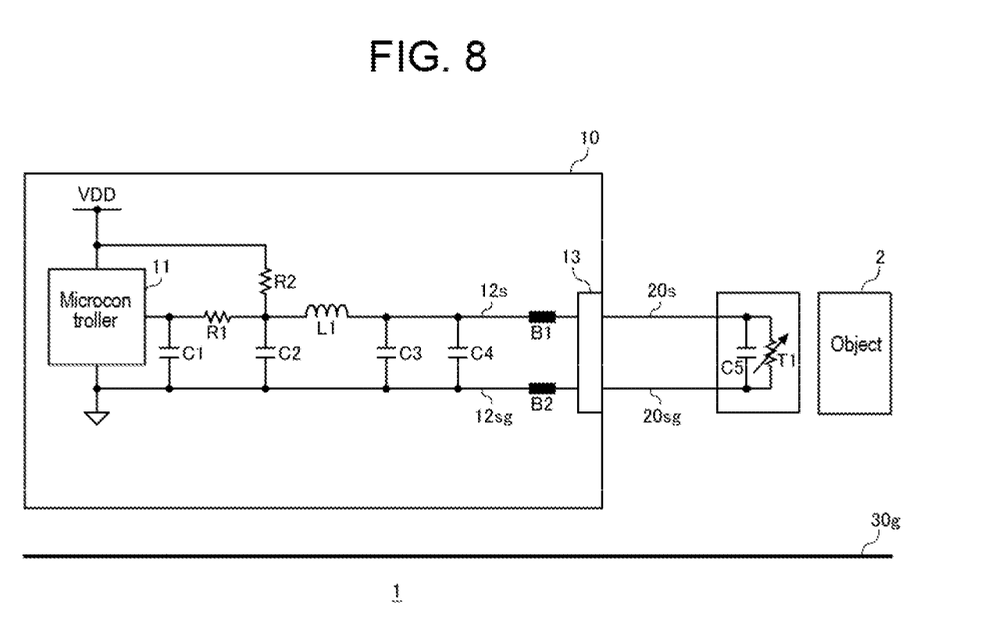
FIG. 8 is a diagram showing a configuration of a temperature detection system according to modified example 5 of the present invention.

FIG. 8 is a diagram showing a configuration of temperature detection system 1 according to modified example 5 of the present invention. In modified example 5, while first chip bead B1 and second chip bead B2 are inserted near connector 13 in circuit device 10, fifth capacitor C5 is connected in parallel to thermistor element T1. Alternatively, the configuration on the side of circuit device 10 may be any one of the configurations of modified examples 1 to 3 shown in FIGS. 4 to 6.

As described above, according to the present exemplary embodiment, through insertion of a chip bead or a damping resistor near connector 13, the noise immunity of thermistor element. T1 can be increased simply and at low cost. As a measure of thermistor element T1 against noise, an inductor may be provided proximately to the both terminals of the thermistor element (for example, see PTL 1). However, an addition of a part in an electric device of a thermistor that is mass produced or provision of a part in the middle part of a harness causes an increase in a cost. The configurations of FIGS. 1 and 4 to 6 each require only an addition of a part in the substrate. Therefore, the noise reduction effect can be obtained at lower cost.

Moreover, in the configuration in which an inductor is provided proximately to the both terminals of the thermistor element, two parts need to be added in a portion having a small mounting area in the electric device. In contrast to this, in the configurations of FIGS. 7 and 8, an equivalent effect can be obtained through an addition of one capacitor. Therefore, the noise reduction effect can be obtained at lower cost.

The present invention has been described heretofore with reference to the exemplary embodiments. The above exemplary embodiments are intended to be illustrative only, and the person of ordinary skill in the art will understand that various modified examples are possible for the combination of configuration elements and processing processes in the exemplary embodiments and that such modified examples are also within the scope of the present invention.

In the exemplary embodiments described above, an example has been described in which a low-pass filter and a n-type filter are connected between microcontroller 11 and connector 13 in circuit device 10. In this respect, the low-pass filter can be omitted. Alternatively, instead of the n-type filter, other types of filter such as an LC filter may be connected.

In the exemplary embodiments described above, an example is assumed in Which the temperature of a driving battery as object 2 is detected. Alternatively, the present invention is applicable to detection of the temperature of another heat source such as a compressor of a car air conditioner. Alternatively, a thermocouple may be used instead of the thermistor.

The exemplary embodiment may be specified by the following items.

[Item 1]

Circuit device (10) for being connected to temperature detection element (T1) that detects a temperature of object (2) via external signal line (20s) and external signal ground line (20sg), circuit device (10) including:

connector (13) that is connected to external signal line (20s) and external signal ground line (20sg);

internal signal line (12s) that is connected to external signal line (20s) via connector (13);

internal signal ground line (12sg) that is connected to external signal ground line (20sg) via connector (13);

controlling circuit (11) that is connected to internal signal line (12s) and internal signal ground line (12sg) and detects the temperature of object (2); and high-frequency filter (B1 and/or B2) that is inserted into at least one of a foremost stage of internal signal line (12s) and a foremost stage of internal signal ground line (12sg) as viewed from connector (13).

According to this, a high-frequency noise current generated near connector (13) can be suppressed.

[Item 2]

Circuit device (10) according to item 1, in which high-frequency filter (B1 and/or B2) is disposed near connector (13).

According to this, noise that is converted from common-mode noise into normal-mode noise near connector (13) can be effectively suppressed.

[Item 3]

Circuit device (10) according to item 1 or 2, in which high-frequency filter (B1 and/or B2) is chip bead (B1 and/or B2).

According to this, high-frequency noise can be suppressed while a direct current component and a low-frequency component are not attenuated.

[Item 4]

Circuit device (10) according to item 1 or 2, in which high-frequency filter (Rd1 and/or Rd2) is damping resistor (Rd1 and/or Rd2).

According to this, high-frequency noise can be suppressed at lower cost.

[Item 5]

Circuit device (10) according to any one of items 1 to 4, in which external signal line (20s) and external signal ground line (20sg) include a wire harness, internal signal line (12s) includes a strip line or, a microstrip line, and internal signal ground line (12sg) includes a ground plane.

According to this, dispositions of circuit device (10) and object (2) can be flexibly adjusted. At the same time, an operation of the substrate is stabilized.

[Item 6]

Temperature detection system (1) including:

temperature detection element (T1) that detects a temperature of object (2);

external signal line (20s) that is connected to one end of temperature detection element (T1);

external signal ground line (20sg) that is connected to another end of temperature detection element (T1); and circuit device (10) that is connected to temperature detection element (T1) via external signal line (20s) and external signal ground line (20sg), in which circuit device (10) includes:

connector (13) that is connected to external signal line (20s) and external signal ground line (20sg);

internal signal line (12s) that is connected to external signal line (20s) via connector (13);

internal signal ground line (12s) that is connected to external signal ground line (20sg) via connector (13);

controlling circuit (11) that is connected to internal signal line (12s) and internal signal ground line (12sg) and detects the temperature of object (2); and high-frequency filter (B1 and/or B2) that is inserted into at least one of a foremost stage of internal signal line (12s) and a foremost stage of internal signal ground line (12sg) as viewed from connector (13).

According to this, temperature detection system (1) can be established in which the high-frequency noise current generated near connector (13) is suppressed.

[Item 7]

Temperature detection system (1) according to item 6, further including capacitor (C5) that is connected in parallel to temperature detection element (T1).

According to this, high-frequency noise that enters temperature detection element (T1) can be bypassed with capacitor (C5).

The invention claimed is:

1. A circuit device for being connected to a temperature detection element that detects a temperature of an object via an external signal line and an external signal ground line, the circuit device comprising:

a connector that is connected to the external signal line and the external signal ground line;

an internal signal line that is connected to the external signal line via the connector;

an internal signal ground line that is connected to the external signal ground line via the connector;

a controlling circuit that is connected to the internal signal line and the internal signal ground line and detects the temperature of the object;

a high-frequency filter that is inserted into at least one of a foremost stage of the internal signal line and a foremost stage of the internal signal ground line as viewed from the connector; and a low-pass filter including a resistor and a capacitor each connected to the high-frequency filter and the controlling circuit;

wherein the external signal line and the external signal ground line each include a wire harness connected to the connector.

2. The circuit device according to claim 1, wherein the high-frequency filter is disposed near the connector.

3. The circuit device according to claim 1, wherein the high-frequency filter is a chip bead.

4. The circuit device according to claim 1, wherein the high-frequency filter is a damping resistor.

5. The circuit device according to claim 1, wherein the internal signal line includes a strip line or a microstrip line, and the internal signal ground line includes a ground plane.

6. A temperature detection system comprising:

a temperature detection element that detects a temperature of an object;

an external signal line that is connected to one end of the temperature detection element;

an external signal ground line that is connected to another end of the temperature detection element; and a circuit device that is connected to the temperature detection element via the external signal line and the external signal ground line,
wherein
the circuit device includes:
a connector that is connected to the external signal line and the external signal ground line;
an internal signal line that is connected to the external signal line via the connector;
an internal signal ground line that is connected to the external signal ground line via the connector;
a controlling circuit that is connected to the internal signal line and the internal signal ground line and detects the temperature of the object;
a high-frequency filter that is inserted into at least one of a foremost stage of the internal signal line and a foremost stage of the internal signal ground line as viewed from the connector; and
a low-pass filter including a resistor and a capacitor each connected to the high-frequency filter and the controlling circuit;
wherein the external signal line and the external signal ground line each include a wire harness connected to the connector.

7. The temperature detection system according to claim 6, further comprising a capacitor that is connected in parallel to the temperature detection element.

* * * * *